United States Patent
Yamada et al.

(10) Patent No.: US 6,744,458 B2
(45) Date of Patent: Jun. 1, 2004

(54) INTERNALLY MARKED QUARTZ GLASS, QUARTZ GLASS SUBSTRATE FOR OPTICAL MEMBER, AND MARKING METHOD

(75) Inventors: Motoyuki Yamada, Niigata-ken (JP); Koji Yamaga, Niigata-ken (JP)

(73) Assignees: Shin-Etsu Chemical Co., Ltd., Tokyo (JP); Naoetsu Precision Co., Ltd., Niigata-ken (JP)

( * ) Notice: Subject to any disclaimer, the term of this patent is extended or adjusted under 35 U.S.C. 154(b) by 0 days.

(21) Appl. No.: 10/242,354

(22) Filed: Sep. 13, 2002

(65) Prior Publication Data

US 2003/0048349 A1 Mar. 13, 2003

(30) Foreign Application Priority Data

Sep. 13, 2001 (JP) ......................................... 2001-277741

(51) Int. Cl.[7] ............................ B41J 2/435; B23K 26/00
(52) U.S. Cl. .................................... 347/224; 219/121.61
(58) Field of Search ................................ 347/224, 239, 347/255; 219/121.6, 121.61, 121.68, 121.85

(56) References Cited

U.S. PATENT DOCUMENTS

| 5,767,483 A | 6/1998 | Cameron et al. ...... 219/121.85 |
| 6,392,683 B1 | 5/2002 | Hayashi ........................ 347/224 |
| 6,417,879 B2 | 7/2002 | Hayashi ........................ 347/224 |
| 2002/0041323 A1 * | 4/2002 | Hayashi et al. .............. 347/224 |

FOREIGN PATENT DOCUMENTS

| EP | 0 985 643 A | 3/2000 |
| JP | 3-124486 | 5/1991 |
| JP | 4-071792 | 3/1992 |
| JP | 4-110944 A | 4/1992 |
| JP | 11-156568 | 6/1999 |
| JP | 11-267861 | 10/1999 |

* cited by examiner

Primary Examiner—Hai Pham
(74) Attorney, Agent, or Firm—Birch, Stewart, Kolasch & Birch, LLP

(57) ABSTRACT

In a quartz glass, a mark is internally made such that a retardation generated in close proximity to the end of the mark is up to 20 nm. The internally marked quartz glass in which internal marks are created without sacrificing optical precision finds use as quartz glass substrates for optical members in the electronic industry.

6 Claims, No Drawings

INTERNALLY MARKED QUARTZ GLASS, QUARTZ GLASS SUBSTRATE FOR OPTICAL MEMBER, AND MARKING METHOD

This invention relates to quartz glass in which internal marks are provided at no sacrifice of the optical precision of quartz glass substrates for optical members, quartz glass substrates for optical members, and methods for marking quartz glass and quartz glass substrates for optical members.

BACKGROUND OF THE INVENTION

In the electronic industry, quartz glass and quartz glass substrates are used, for example, as mask substrates serving as the substrate bearing a lithographic writing pattern, and TFT panel substrates of projection cells in an image projector. To meet these applications, quartz glass and quartz glass substrates are surface polished before they are used as quartz glass substrates having a high precision polished surface free of particle or dust, while taking advantage of their excellent light transmittance and high heat resistance. However, problems arise in the electronic industry. Since a numerous number of quartz glass substrates are used, the management of individual substrates is cumbersome. Since there are many types of quartz glass, taking a look at quartz glass substrates often fails to identify their type. To identify individual quartz glass substrates, a marking technique of providing physical changes to quartz glass substrates has been proposed.

One known method for marking quartz glass is a so-called laser ablation method of irradiating laser light to the surface of quartz glass to induce melting, evaporation or the like, thereby inscribing the glass surface. When the quartz glass is inscribed by this method, not only marking recesses are generated in the quartz glass surface, but micro-cracks are created near the marks. Then, contaminants will deposit in the recesses, glass particles will be released as a result of spalling of cracks. They adhere to the quartz surface, and the quartz glass becomes unsuitable in the above-mentioned application requiring a high degree of cleanness on the substrate surface.

Then, methods of making marks within quartz glass were proposed. For example, JP-A 3-124486 refers to the exposure laser energy upon marking and discloses that marking is possible with an exposure energy density which is 5 to 20 times as large as the breaking threshold of quartz glass surface. JP-A 4-71792 discloses that marks which are identified as white signs are formed in a mark-forming region of a quartz glass substrate. JP-A 11-156568 describes the use of a fθ lens to prevent the focus from shifting during marking, and JP-A 11-267861 describes to induce optical changes in a light-transmissive material using a femto-second pulse laser.

These methods work well with quartz glass substrates used in the electronic industry requiring a degree of cleanness because by condensing laser light within quartz glass, changes can be induced only in the interior of quartz glass without causing damages to the quartz glass surface. However, these patents merely disclose the marking of quartz glass or transparent materials while referring nowhere to the optical properties essential to the quartz glass or transparent materials to be marked.

The optical properties of glasses including quartz glass essentially depend on their preparation method. Optical properties include such items as transmittance, refractive index, birefringence, wavelength dispersion and the like. Quartz glass used in the electronic industry is required to be an isotropic material which is optically homogeneous in any of these items, depending on a particular application. For example, an optical glass material used in a stepper for LSI manufacture must achieve sufficient homogeneity with respect to all of the above items before it can be used as the glass material.

Among the optical properties, birefringence is a phenomenon arising due to a photoelastic effect when stresses are present in glass or transparent material. More specifically, when non-polarized light passes through a transparent material, the light is given polarity by the stresses applied to or internal stresses in the transparent material, and the refractive index of the transparent material differs with the wavefront angle of the light. This brings about a difference in the propagation velocity of light, resulting in a wavefront difference in the output light. If birefringence is present in a glass material used in an optical system requiring a high degree of optical precision as in a stepper for LSI manufacture, the birefringence can cause to exacerbate the resolution of a projected image.

SUMMARY OF THE INVENTION

An object of the invention is to provide an internally marked quartz glass in which quartz glass or a quartz glass substrate for an optical member is given internal marks, while the birefringence of the glass is controlled, whereby the quantity of retardation derived from birefringence is controlled, so that the internally marked quartz glass does not compromise the optical precision when used in an optical system as a quartz glass substrate for an optical member in the electronic industry. Another object is to provide an internally marked quartz glass substrate for an optical member. A further object is to provide an internal marking method.

We have found that during formation of internal marks in quartz glass or a quartz glass substrate for an optical member, if the quantity of retardation caused by internal strains generated around the mark is suppressed to 20 nm or less at a position in close proximity to the mark end, an internally marked quartz glass or an internally marked quartz glass substrate for an optical member is obtained without detracting from the optical precision thereof.

In a first aspect, the invention provides an internally marked quartz glass in which a mark is internally made such that a retardation generated in close proximity to the end of the mark is up to 20 nm.

Preferably the internally marked quartz glass is synthetic quartz glass. Typically, quartz glass substrates for lithography are made from the internally marked quartz glass.

The invention also provides a quartz glass substrate for use as an optical member which is manufactured from the internally marked quartz glass.

The invention further provides a method for internally making a mark within a quartz glass or a quartz glass substrate for use as an optical member, comprising the steps of condensing a laser beam having a wavelength of up to 360 nm within the quartz glass or quartz glass substrate, and performing laser irradiation to a cumulative exposure of up to 10 J/cm$^2$.

DESCRIPTION OF THE PREFERRED EMBODIMENTS

In the internally marked quartz glass and quartz glass substrate for an optical member according to the invention, the retardation generated by marking is 20 nm or less, preferably 5 nm or less, at a position in close proximity to the end of the mark. Birefringence, when having a large value, can cause variations in the intensity of light in light paths and thus reduce the optical precision of the system. If the quantity of retardation derived from birefringence is 20 nm or less, birefringence does not cause a substantial drop in the optical precision of an LSI manufacture stepper. In an optical instrument having an optical system whose properties are affected by the polarization phenomenon of light, such as a polarization beam splitter and catoptric system, its optical precision is not substantially reduced if the retardation is 5 nm or less.

As used herein, the term "(position) in close proximity to the end of the mark" means that measurement is done at a point spaced within 1 mm from the end of the mark.

Birefringence is represented by refractive indices of ordinary and extraordinary rays and reveals itself as a phase difference between the ordinary and extraordinary rays transmitted by a specimen. This phase difference stands for the retardation and is determined by the difference between two refractive indices multiplied by the thickness of the specimen.

The internally marked quartz glass or quartz glass substrate for an optical member is obtainable by condensing a laser beam in the interior of quartz glass to achieve internal marking. The lasers used for internal marking include solid-state lasers such as a Nd:YAG laser and Nd:YLF laser and gas lasers such as a $CO_2$ laser, and a proper choice may be made among such laser beams and short-wavelength laser beams utilizing harmonics thereof. KrF and ArF excimer lasers may also be used. Preferably, a laser beam having a wavelength of 360 nm or less is condensed into the interior of quartz glass and irradiated to a cumulative exposure of up to 10 $J/cm^2$. If a laser beam has a long wavelength in the infrared region, its transmittance through quartz glass is so low that the light is attenuated within the quartz glass before it reaches the focus. Then, satisfactory marking is not accomplished or substantial limits are imposed to the marking conditions. If a laser beam has a wavelength in the visible to near ultraviolet region, the photon energy is low. Then, satisfactory marking is not accomplished or the marking conditions are restricted in the sense that marking is possible only with a laser oscillator of higher power than necessity. If the cumulative exposure is more than 10 $J/cm^2$, the retardation in close proximity to the marking end can exceed 20 nm.

The surface roughness of quartz glass, when expressed by root mean square (RMS), should preferably be 10 nm or less and especially 1 nm or less. Since an optical element such as a lens, mirror or the like functions to condense or focus laser light to the interior of quartz glass or a quartz glass substrate for an optical member after passing the surface thereof, the roughness or flatness of the substrate surface can have an influence on the condensed state of light. However, since the light-transmissive quartz glass or quartz glass substrate for an optical member for use in the electronic industry generally has undergone high-precision polishing, and thus has a surface roughness of 10 nm or less in RMS, it may be often subjected to laser marking without further treatment.

The quartz glass material used herein is preferably synthetic quartz glass. Ordinary quartz glass prepared using rock crystal as the raw material can deteriorate the condensed state of laser light because it contains granular structures having minute variations of refractive index, internal bubbles and other defects which detract from the optical homogeneity of quartz glass. On the other hand, synthetic quartz glass prepared from silicon compounds through thermochemical reaction contains few granular structures and internal bubbles which detract from the optical homogeneity of quartz glass.

The condensed laser beam can cause damages within quartz glass whereby optical heterogeneity in the form of micro-cracks and refractive index changes is generated within quartz glass. This optical heterogeneity is recognized as a mark by visual observation or photoelectronic detection. The size of a mark is dependent on the condensed state and exposure energy quantity of a laser beam. When a laser beam is fully condensed to give the quartz glass a minimum necessary quantity of exposure energy to form optical heterogeneity, a mark of minute size is created. Even under the same condensed state of laser beam, the size of the mark is increased by increasing the exposure energy.

The degree of birefringence generated in proximity to the marked site increases with the increasing exposure energy quantity, and so does the retardation derived from the birefringence. To inhibit the retardation from increasing, the relationship of the retardation to the marking conditions must be strictly understood and controlled. Specifically, marking is carried out under such conditions that the retardation generated as a result of marking is 20 nm or less, preferably 5 nm or less. These conditions are achievable by a method for internally making a mark within a quartz glass or quartz glass substrate for an optical member, comprising the steps of condensing a laser beam having a wavelength of up to 360 nm within the quartz glass, and performing laser irradiation to a cumulative exposure of up to 10 $J/cm^2$.

Pertinents are the laser exposure conditions including the wavelength and pulse width of a laser beam, single pulse energy and overall pulse energy during the marking, and the technical items associated with marking including the focus and numerical aperture of an optical system and the distance between marks. All these conditions are empirically investigated until the desired mark is made.

The internal marks or laser irradiated traces are created within the quartz glass or quartz glass substrate in the form of a single dot or a linear or two-dimensional information-bearing pattern of dots, known as bar code. The laser irradiated traces or an assembly thereof may be given any form of information such as a picture or image.

EXAMPLE

Examples of the invention are given below by way of illustration and not by way of limitation. In Examples, a retardation was measured using an automatic birefringence evaluation system ABR-10-30A (by UNIOPT Co., Ltd.)

Example 1

A synthetic quartz substrate of 6.35 mm thick for LSI fabrication prior to internal marking was measured for retardation using the birefringence evaluation system ABR-10-30A, finding a retardation of 3.2 to 4.0 nm. The substrate was also measured for surface roughness by atomic force microscopy, finding RMS=0.8 nm.

A Nd-doped YAG laser, a convex lens and the synthetic quartz substrate for LSI fabrication were set such that the third harmonic (wavelength 355 nm) of the laser was condensed through the convex lens having a focal distance of 80 mm so as to focus within the quartz substrate. The laser beam with an energy quantity of 1 mJ/shot was irradiated one shot, making a white dot-shaped mark within the quartz glass. The exposure energy density was 0.13 J/cm². An area of 10 mm×10 mm about the dot was measured for retardation at intervals of 0.5 mm using the birefringence evaluation system. As compared with the retardation of 3.2 to 4.0 nm measured at the same site prior to exposure, a retardation increase was 0.2 to 0.6 nm.

Example 2

A synthetic quartz substrate of 6.35 mm thick for LSI fabrication prior to internal marking was measured for retardation using the birefringence evaluation system ABR-10-30A, finding a retardation of 0.5 to 0.8 nm. The substrate was also measured for surface roughness by atomic force microscopy, finding RMS=0.75 nm.

A Nd:YAG laser, a convex lens and the synthetic quartz substrate were set such that the third harmonic (wavelength 355 nm) of the laser was condensed through the convex lens having a focal distance of 80 mm so as to focus within the quartz substrate. The laser beam with an energy quantity of 1 mJ/shot was irradiated 50 shots, making a white dot-shaped mark within the quartz glass. The exposure energy density was 6.4 J/cm². An area of 10 mm×10 mm about the dot was measured for retardation at intervals of 0.5 mm using the birefringence evaluation system. As compared with the retardation of 0.5 to 0.8 nm measured at the same site prior to exposure, a retardation increase was 14.2 to 16.6 nm.

Example 3

Within synthetic quartz glass of the same material as in Example 1, internal laser marking was carried out at 10 positions under the same conditions as in Example 1. The marked dots were observed under an optical microscope with 200×magnification. All the dots were found to be white circles having a diameter of approximately 100 μm.

Comparative Example 1

A synthetic quartz substrate of 6.35 mm thick for LSI fabrication prior to internal marking was measured for retardation using the birefringence evaluation system ABR-10-30A, finding a retardation of 1.3 to 2.0 nm. The substrate was also measured for surface roughness by atomic force microscopy, finding RMS=0.72 nm.

A Nd:YAG laser, a convex lens and the synthetic quartz substrate were set such that the third harmonic (wavelength 355 nm) of the laser was condensed through the convex lens having a focal distance of 80 mm so as to focus within the quartz substrate. The laser beam with an energy quantity of 1 mJ/shot was irradiated 100 shots, making a white dot-shaped mark within the quartz glass. The exposure energy density was 13 J/cm². An area of 10 mm×10 mm about the dot was measured for retardation at intervals of 0.5 mm using the birefringence evaluation system. As compared with the retardation of 1.3 to 2.0 nm measured at the same site prior to exposure, a retardation increase was 21.6 to 23.4 nm.

Comparative Example 2

Within a substrate of quartz glass made from rock crystal raw material, internal laser marking was carried out at 10 positions under the same conditions as in Example 3. The ten marked dots had circular shapes having a diameter ranging from 50 μm to 100 μm, indicating that in the case of quartz glass made from rock crystal raw material, marking was inconsistent.

Comparative Example 3

A synthetic quartz substrate of 6.35 mm thick for LSI fabrication was previously measured for retardation using the birefringence evaluation system ABR-10-30A. The substrate was also measured for surface roughness by atomic force microscopy, finding RMS=0.8 nm.

A Nd:YAG laser, a convex lens and the synthetic quartz substrate were set such that the second harmonic (wavelength 532 nm) of the laser was condensed through the convex lens having a focal distance of 80 mm so as to focus within the quartz substrate. The laser beam with an energy quantity of 1 mJ/shot was irradiated 10 shots, but no markings were created within the quartz glass.

There have been described quartz glass in which internal marks are created without sacrificing optical precision. It finds use as quartz glass substrates for optical members in the electronic industry.

Japanese Patent Application No. 2001-277741 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An internally marked quartz glass in which a mark, in the form of microcracks and refractive index changes, is internally made such that a maximum retardation measured between ordinary and extraordinary beams transmitted at a point within 1 mm from the edge or end of the mark, is not more than 20 nm.

2. The internally marked quartz glass of claim 1 which is synthetic quartz glass.

3. An optical member comprising the internally marked quartz glass of claim 1 as a substrate.

4. A lithographic method comprising a step of marking a quartz glass to make the internally marked quartz glass of claim 1 as a substrate in lithography.

5. A method for internally making a mark within a quartz glass, comprising the steps of condensing a laser beam having a wavelength of up to 360 nm within the quartz glass, and performing laser irradiation to a cumulative exposure of up to 10 J/cm², wherein said mark is in the form of microcracks and refractive index changes, and is internally made such that a maximum retardation measured between ordinary and extraordinary beams transmitted at a point within 1 mm from the edge or end of the mark, is not more than 20 nm.

6. A method for internally making a mark within a quartz glass substrate for use as an optical member, comprising the steps of condensing a laser beam having a wavelength of up to 360 nm within the quartz glass substrate, and performing laser irradiation to a cumulative exposure of up to 10 J/cm², wherein said mark is in the form of microcracks and refractive index changes, and is internally made such that a maximum retardation measured between ordinary and extraordinary beams transmitted at a point within 1 mm from the edge or end of the mark, is not more than 20 nm.

* * * * *